(12) United States Patent
Malik et al.

(10) Patent No.: US 7,903,624 B2
(45) Date of Patent: Mar. 8, 2011

(54) METHODS AND APPARATUS FOR SIMPLIFIED SETUP OF CENTRALIZED WLAN SWITCHING

(75) Inventors: Ajay Malik, San Jose, CA (US); Sujai Hajela, Saratoga, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 929 days.

(21) Appl. No.: 11/679,237

(22) Filed: Feb. 27, 2007

(65) Prior Publication Data

US 2007/0201417 A1     Aug. 30, 2007

Related U.S. Application Data

(60) Provisional application No. 60/777,533, filed on Feb. 27, 2006.

(51) Int. Cl.
*H04Q 7/24* (2006.01)
(52) U.S. Cl. .......................... 370/338; 370/465
(58) Field of Classification Search ................. 370/338, 370/465
See application file for complete search history.

(56) References Cited

U.S. PATENT DOCUMENTS

| | | | |
|---|---|---|---|
| 2003/0112820 A1* | 6/2003 | Beach | 370/465 |
| 2005/0053046 A1 | 3/2005 | Wang | |
| 2005/0180367 A1* | 8/2005 | Dooley et al. | 370/338 |

OTHER PUBLICATIONS

International Search Report for PCT/US2007/062847 mailed Dec. 7, 2007.

* cited by examiner

*Primary Examiner* — Phuoc Doan

(57) ABSTRACT

A wireless data communication system includes an access port configured to wirelessly communicate with a plurality of mobile units within multiple basic service sets (BSS), and a wireless switch having multiple predefined wireless local area networks (WLANs). The wireless switch is configured to automatically map the WLANs to the basic service sets and transmit to the access port a configuration template depending upon the type of access port. In one embodiment, there are n basic service sets, each having a corresponding basic service set identifier (BSSID), and m WLANs, each having a corresponding WLAN index, wherein the m WLAN indices are uniformly mapped to the n BSSIDs such that each BSSID has substantially the same number of WLAN indices mapped thereto. In a particular embodiment, there are n=4 BSSIDs per access port and m=16 pre-mapped WLANs. In this way, the wireless switch and respective access ports can be set-up in a simplified manner, in much the same way that set-up is performed with traditional access points.

13 Claims, 2 Drawing Sheets

METHODS AND APPARATUS FOR SIMPLIFIED SETUP OF CENTRALIZED WLAN SWITCHING

CROSS-REFERENCE TO RELATED APPLICATIONS

This application claims priority to U.S. Provisional Application No. 60/777,533, filed Feb. 27, 2006.

TECHNICAL FIELD

The present invention relates generally to wireless local area networks (WLANs) and, more particularly, to simplified set-up of wireless access ports and switches in a WLAN.

BACKGROUND

In recent years, there has been a dramatic increase in demand for mobile connectivity solutions utilizing various wireless components and wireless local area networks (WLANs). This generally involves the use of wireless access points that communicate with mobile devices using one or more RF channels.

In one class of wireless networking systems, relatively unintelligent access ports act as RF conduits for information that is passed to the network through a centralized intelligent switch, or "wireless switch," which controls wireless network functions. In such systems, however, set-up of the wireless switch and access points can be difficult.

That is, while in traditional access points the system begins working, with minimal configuration, as soon as it is installed at the edge of a standard Ethernet network, wireless switches and corresponding access ports are typically installed manually. This requires an administrator to carefully assign WLANs to basic service sets and specific access ports. As the number of wireless switches and access ports increases, this task becomes increasingly cumbersome.

Furthermore, after access ports are assigned to switches and basic service sets, the individual access ports must be configured. This typically involves downloading to the access port a configuration image that sets certain default parameters, which might require additional tuning by the administrator.

Accordingly, it is desirable to provide wireless switches and access ports that can be set up in an efficient and scalable manner. Furthermore, other desirable features and characteristics of the present invention will become apparent from the subsequent detailed description and the appended claims, taken in conjunction with the accompanying drawings and the foregoing technical field and background.

BRIEF SUMMARY

In general, the present invention relates to a wireless switch including a pre-configured mapping of WLANs to basic service sets, as well as one or more templates that are automatically downloaded to access ports as they are adopted by the system, thereby greatly simplifying the set-up process.

In accordance with a particular embodiment, a wireless data communication system includes an access port configured to wirelessly communicate with a plurality of mobile units within multiple basic service sets (BSS), and a wireless switch having multiple predefined wireless local area networks (WLANs). The wireless switch is configured to automatically map the WLANs to the basic service sets and transmit to the access port a configuration template depending upon the type of access port. In one embodiment, there are n basic service sets, each having a corresponding basic service set identifier (BSSID), and m WLANs, each having a corresponding WLAN index, wherein the m WLAN indices are uniformly mapped to the n BSSIDs such that each BSSID has substantially the same number of WLAN indices mapped thereto. In a particular embodiment, there are n=4 BSSIDs per access port and m=16 pre-mapped WLANs. In this way, the wireless switch and respective access ports can be set-up in a simplified manner, in much the same way that set-up is performed with traditional access points.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
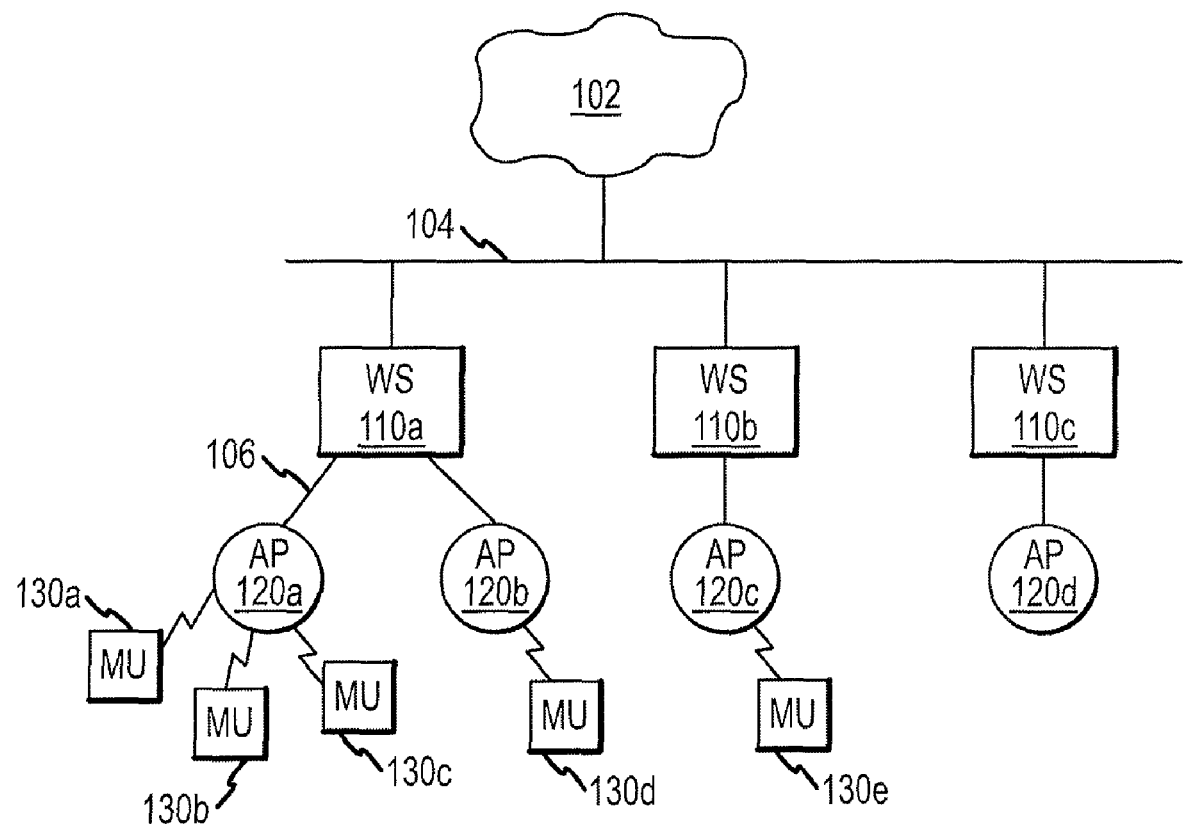
FIG. 1 is a conceptual overview of a wireless network useful in describing the present invention.

The following detailed description is merely exemplary in nature and is not intended to limit the range of possible embodiments and applications. Furthermore, there is no intention to be bound by any theory presented in the preceding background or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The terms "comprise," "include," "have" and any variations thereof are used synonymously to denote non-exclusive inclusion. The terms "left," right," "in, out," "front," "back," "up," "down," and other such directional terms are used to describe relative positions, not necessarily absolute positions in space. The term "exemplary" is used in the sense of "example," rather than "ideal."

For the sake of brevity, conventional techniques related to signal processing, data transmission, signaling, network control, the 802.11 family of specifications, and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Without loss of generality, in the illustrated embodiment, many of the functions usually provided by a traditional access point (e.g., network management, wireless configuration, and the like) are concentrated in a corresponding wireless switch. It will be appreciated that the present invention is not so limited, and that the methods and systems described herein may be used in the context of other network architectures.

Referring to FIG. 1, one or more switching devices 110 (alternatively referred to as "wireless switches," "WS," or simply "switches") are coupled to a network 104 (e.g., an Ethernet network coupled to one or more other networks or devices, indicated by network cloud 102). One or more wireless access ports 120 (alternatively referred to as "access ports" or "APs") are configured to wirelessly connect to one or more mobile units 130 (or "MUs") after a suitable AP adoption process. APs 120 are suitably connected to corresponding switches 110 via communication lines 106 (e.g., conventional Ethernet lines). Any number of additional and/or intervening switches, routers, servers and other network components may also be present in the system. APs 120 may have a single or multiple built-in radio components.

A particular AP 120 may have a number of associated MUs 130. For example, in the illustrated topology, MUs 130(a), 130(b), and 130(c) are associated with AP 120(a), while MU 130(e) is associated with AP 120(c). Furthermore, one or more APs 120 may be connected to a single switch 110. Thus, as illustrated, AP 120(a) and AP 120(b) are connected to WS 110(a), and AP 120(c) is connected to WS 110(b).

Each WS 110 determines the destination of packets it receives over network 104 and routes that packet to the appropriate AP 120 if the destination is an MU 130 with which the AP is associated. Each WS 110 therefore maintains a routing list of MUs 130 and their associated APs 120. These lists are generated using a suitable packet handling process as is known in the art. Thus, each AP 120 acts primarily as a conduit, sending/receiving RF transmissions via MUs 130, and sending/receiving packets via a network protocol with WS 110.

AP 120 is typically capable of communicating with one or more MUs 130 through multiple RF channels. This distribution of channels varies greatly by device, as well as country of operation. For example, in one U.S. embodiment (in accordance with 802.11(b)) there are fourteen overlapping, staggered channels, each centered 5 MHz apart in the RF band.

Using the terminology utilized in the 802.11 family of standards, a basic service set (BSS) is a set of stations (e.g., MUs 130 and APs 120) controlled by a single coordination function. An extended service set (ESS) is a set of one or more interconnected BSSs and integrated LANs that appear as a single BSS to the logical link control layer at any station association with one of those BSSs. Each BSS has an ID (BSSID), e.g., the MAC address of the corresponding AP 120. The AP 120 generates any management and/or control frames (e.g., beacons and the like) using this BSSID as the source. The service set ID (SSID) is the name of the network (i.e., the WLAN), and in one embodiment is a name of up to 32 characters in length.

Figure 3:
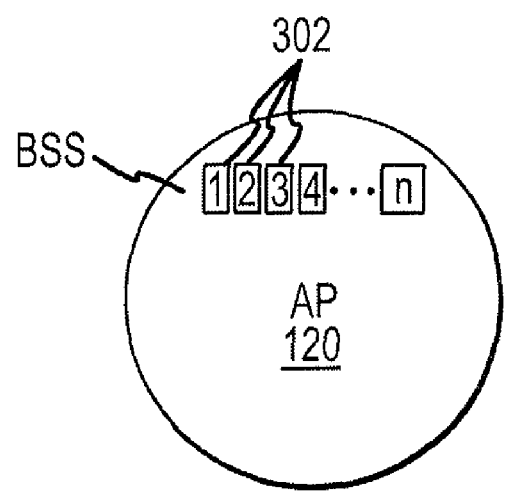
FIG. 3 is a conceptual diagram of an access port in accordance with the invention.

In general, wireless access ports and wireless switches in accordance with the present invention can be set-up and configured in a manner similar to traditional access points. An AP 120 in accordance with the present invention is configured to wirelessly communicate with MUs 130 within multiple BSSs. That is, the AP can support two or more BSSIDs. Referring to the conceptual diagram shown in FIG. 3, an AP 120 is shown as having a number of predefined BSSs 302—i.e., BSS 1, BSS 2, BSS 3 . . . BSS n. Note that the use of successive integer values for the BSSID is for the purpose of example only, and that the BSSID may be any convenient numeric or alphanumeric value. In one embodiment, for example, the BSSID corresponds to a conventional MAC address.

Figure 2:
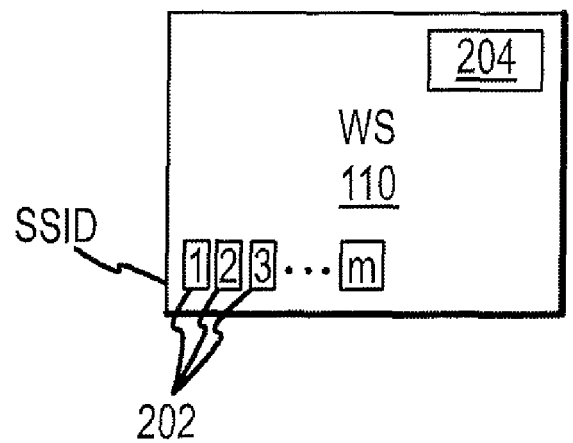
FIG. 2 is a conceptual diagram of a wireless switch in accordance with the invention.

A wireless switch 110 in accordance with the present invention includes multiple predefined WLANs. That is, referring to FIG. 2, WS 110 has m predefined WLANs 202 each having corresponding ESSIDs. The number 1, 2, . . . , n is generally referred to as the WLAN index. The ESSID logically differentiates BSS based on, for example, security policy. In one embodiment, an SSID preferably has a single authentication type (e.g., none/eap/web-auth), and a single encryption type, but can implement TKIP and AES simultaneously.

In accordance with one aspect of the invention, wireless switch 110 is configured to automatically map WLANs 202 to BSSs 302. In one embodiment, the m WLAN indices are uniformly mapped to the n BSSIDs such that each BSSID has substantially the same number of associated WLAN indices. The number of BSSIDs per AP and predefined WLANs per wireless switch may vary, but in one embodiment there are four BSSs per AP (and thus 4 MAC addresses) and 32 WLANs per wireless switch, where 16 of the WLANs are automatically mapped to the BSSs such that each BSSID is associated with four WLAN indices.

In a particular embodiment, for example, BSSs are assigned to individual WLANs as set forth in the following table.

| BSS | WLAN index |
|-----|------------|
| 1   | 1, 5, 9, 13 |
| 2   | 2, 6, 10, 14 |
| 3   | 3, 7, 11, 15 |
| 4   | 4, 8, 12, 16 |

Note that the wireless switch may include additional WLANs (e.g., WLAN indices 17-32) that are not auto-mapped to a particular BSS. Such WLANs may require manual assignment to respective BSSs. That is, wireless switch 110 may have two different modes: one in which BSSs are automapped, and another in which a user or administrator is able to manually map and unmap WLANs. In normal mode, whenever a WLAN is enabled or disabled, it is auto-mapped or un-mapped to BSSs.

In one embodiment, the wireless switch is configured such that BSSs are enabled in a particular AP when a corresponding WLAN is enabled. Thus, if the administrator enables WLAN 5 within the wireless switch detailed above (e.g., through the use of a command line interface or graphical user interface), BSS 1 on associated APs would be used for traffic sent over WLAN 5.

In accordance with another aspect of the invention, wireless switch 110 is configured to store one or more configuration templates 204 and then transmit the appropriate configuration template to access port 120 depending upon the nature, type, etc. of the access port. The configuration template 204 typically includes a set of default settings for the access port, and is automatically downloaded from switch 110 to AP 120 when AP 120 is adopted. These default settings may relate, for example, to which 802.11 standard that AP adheres to (e.g., 802.11a, 802.11b, etc.).

In a preferred embodiment, configuration template 204 includes default settings as listed in the following table.

| Parameter | Description |
| --- | --- |
| adoption-pref-id | Preference identifier for the access port that specifies preferred wireless switch for adoption |
| antenna-mode | Antenna diversity mode: "diversity" (full diversity for both antennas); "primary" (primary antenna only); "secondary" (secondary antenna only) |
| beacon-interval | Beacon interval in K-uSec. (e.g., 50–200) |
| bss | Map WLANs to BSSIDs |
| channel-power | Location, channel, and transmit power level (based on country code). |
| detector | Dedicate this AP as a detector. No stations can associate to a detector. |
| dtim-period | DTIM period (number of beacons between successive DTIMs) (1–50). |
| max-stations | Maximum number of stations allowed to be associated with the AP. |
| rts-threshold | RTS threshold. |
| self-heal-offset | Configure the self-healing offset |
| speed | Configure the basic and supported data rates/speed |
| wmm | 802.11e/Wireless Multimedia parameters - e.g., background, video, best effort, voice, followed by interframe spacing number, transmit opportunity, burst, contention window, etc. |

In one embodiment, two such templates are stored in the wireless switch: one corresponding to an AP conforming to IEEE 802.11(a), and another conforming to IEEE 802.11(b), (g). Note that there may be regulations that require that the country code be entered manually by an administrator. In such a case, any of the automatic steps described above will typically be performed after the country code has been entered.

It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A wireless data communication system comprising:
   an access port configured to wirelessly communicate with a plurality of mobile units within multiple basic service sets, wherein said multiple basic service sets includes n basic service sets, each having a corresponding basic service set identifier (BSSID); and
   a wireless switch having m multiple predefined wireless local area networks (WLANs), each having a corresponding WLAN index, said wireless switch configured to automatically uniformly map said m WLANs to said n basic service set identifiers such that each BSSID has substantially the same number of WLAN indices mapped thereto, and transmit to said access port a configuration template responsive to a type of said access port.

2. The system of claim 1, wherein n is between 2 and 6, inclusive, and m is between 16 and 64, inclusive.

3. The system of claim 2, wherein n is equal to 4, m is equal to 16, and each BSSID is mapped to four WLAN indices.

4. The system of claim 1, wherein said configuration template includes a set of default settings for said access port.

5. The system of claim 1, wherein said access port includes at least two radio transceivers.

6. The system of claim 1, wherein said wireless switch includes a manual configuration mode, wherein said manual configuration mode allows a user to change said mapping of said basic service sets to said WLANs.

7. The system of claim 1, wherein said wireless switch is configured to allow a user to selectively enable said WLANs.

8. The system of claim 7, wherein said template is transmitted to said access port during an adoption process performed by said wireless switch and said access port.

9. The system of claim 1, wherein said wireless switch includes additional predefined WLANs that are not pre-mapped to said basic service sets.

10. A method for setting up a wireless network comprising:
    providing an access port configured to wirelessly communicate with a plurality of mobile units within multiple basic service sets, wherein said multiple basic service sets includes n basic service sets, each having a corresponding basic service set identifier (BSSID);
    providing a wireless switch having m multiple predefined wireless local area networks (WLANs), each having a corresponding WLAN index,
    automatically uniformly mapping said m WLANs to said n basic service set identifiers such that each BSSID has substantially the same number of WLAN indices mapped thereto; and
    transmitting from said wireless switch to said access port a configuration template responsive to a type of said access port.

11. The method of claim 10, wherein transmitting said configuration template includes transmitting a set of default settings for said access port.

12. The method of claim 11, wherein said template is transmitted to said access port during an adoption process performed by said wireless switch and said access port.

13. The method of claim 10, further including selectively enabling said WLANs.

* * * * *